(12) United States Patent
Sakai et al.

(10) Patent No.: US 8,162,411 B2
(45) Date of Patent: Apr. 24, 2012

(54) INTEGRALLY FORGED LINK FOR ENDLESS TRACK

(75) Inventors: Takao Sakai, Fujisawa (JP); Makoto Ueda, Naka•gun (JP); Akiyoshi Kurihara, Quingdao (CN); Eiji Nakagawa, Chigasaki (JP); Yusuke Kinpara, Chigasaki (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 6 days.

(21) Appl. No.: 12/373,252

(22) PCT Filed: May 9, 2007

(86) PCT No.: PCT/JP2007/059568
§ 371 (c)(1),
(2), (4) Date: Jan. 9, 2009

(87) PCT Pub. No.: WO2008/007494
PCT Pub. Date: Jan. 17, 2008

(65) Prior Publication Data
US 2009/0230763 A1    Sep. 17, 2009

(30) Foreign Application Priority Data
Jul. 11, 2006 (JP) ................................ 2006-190182

(51) Int. Cl.
*B62D 55/21* (2006.01)
(52) U.S. Cl. ........................................ 305/201; 305/198

(58) Field of Classification Search .................. 305/196, 305/197, 198, 200, 201, 202, 203, 204
See application file for complete search history.

(56) References Cited

U.S. PATENT DOCUMENTS

| | | | | |
|---|---|---|---|---|
| 1,333,175 A | * | 3/1920 | Johnson | 305/191 |
| 2,168,053 A | * | 8/1939 | Starr et al. | 305/59 |
| 3,419,316 A | * | 12/1968 | Mazzarins | 305/188 |
| 3,815,962 A | * | 6/1974 | Stedman et al. | 305/187 |
| 3,947,074 A | * | 3/1976 | Nelson | 305/190 |
| 4,083,611 A | * | 4/1978 | Schaffner et al. | 305/186 |

FOREIGN PATENT DOCUMENTS

| | | |
|---|---|---|
| JP | 59-220467 A | 12/1984 |
| JP | 11-180355 A | 7/1999 |
| JP | 11180355 A | 7/1999 |
| JP | 2004-249797 A | 9/2004 |
| JP | 2004249797 A | 9/2004 |

OTHER PUBLICATIONS

Extended European Search Report, directed to EP 07 74 3003.1, mailed on Sep. 30, 2009, 6 pages.

* cited by examiner

*Primary Examiner* — Kip T Kotter
(74) *Attorney, Agent, or Firm* — Smith Patent Office

(57) ABSTRACT

An endless track link that is able to reduce stress concentrations and to improve efficiency of an assembling process of the endless track link is detailed. A stress reinforcing part is formed in the region in which stress concentrations are generated in a window area. The reinforcing part extends in a direction apart from a track shoe and includes an extended part of a through-hole into which a track shoe connecting bolt is inserted. A female thread for engaging with the track shoe connecting bolt is formed at the extended part of the through-hole.

1 Claim, 4 Drawing Sheets

INTEGRALLY FORGED LINK FOR ENDLESS TRACK

BACKGROUND OF THE INVENTION

1. Field of the Invention

The present invention relates to an improvement of an endless track link which is a part of an endless track as a base carrier of a construction vehicle.

2. Description of the Related Art

FIG. 6 is a side view showing a part of an endless track (a crawler belt) in the prior art and FIG. 7 is a sectional view taken on line X-X of FIG. 6.

In FIGS. 6 and 7, an endless track 200 comprises a plurality of "pieces" (a unit of the endless track). Each piece comprises a track shoe R, a pair of links 101 connected to the track shoe R, and a pin P connecting the piece to an adjacent piece (that fits into a bushing Bu in FIGS. 6 and 7).

In FIGS. 6 and 7, a bolt B fastens a track shoe R to the endless track links 101. Also shown in a nut N engaged with the bolt B, and a reference character O represents a center axis of the pin P.

In a link 101 shown in FIG. 6, there are two window areas 50. In the endless track link 101 shown in FIGS. 6 and 7, a bolt B is inserted into a through-hole of the link 101 which a through-hole is pierced through the link 101 from a side of the track shoe R to the window area 50. A nut N is placed in the window area 50, the bolt B engages with the nut N, and thereby the track shoe R is fastened to the link 101.

FIGS. 8 and 9 show the endless track link 101, respectively. FIG. 8 shows a side view of the endless track link 101 and FIG. 9 shows a sectional view on the line X-X of FIG. 8.

In FIG. 8, on both the sides of the endless track link 101 in the longitudinal direction (at both the left end 1 and the right end 2), there are a first through-hole (on the side of the left end 1) 3 through which a pin P penetrates and a second through-hole (on the side of the right end 2) 4 through which a bushing Bu penetrates.

Referring also to FIG. 9, a counter bore 32 and a through-hole 31 are formed concentrically in the first through-hole 3 and the diameter of the through-hole 31 is set so as to be smaller than that of the counter bore 32.

As shown in FIG. 9, the endless track link 101 is configured so that, when pieces are connected to each other, the opening 42 on the lower side of the second through-hole 4 faces the counter bore 32 of the first through-hole 3 in an another link 101 being shown by the chain double-dashed line in FIG. 9 (the link of an adjacent piece). The opening 42 and 32 make a generally flat plane.

As shown in FIG. 8, two window areas 50 are formed in the region between the first through-hole 3 and the second through-hole 4.

The bottom plane of a link lower part 6 (the end face on the lower side in FIG. 8) is a plane 6a to which a track shoe R (FIGS. 6 and 7) is attached. Bolt through-holes 80 piercing through to each of the window areas 50, 50 are formed from the track shoe attaching plane 6a in a direction being perpendicular to the track shoe attaching plane 6a (in the vertical direction in FIG. 8). Each of the bolt through-holes 80 is formed by, for example, drilling.

In the case of the link 101 shown in FIGS. 6 to 11, a strut (a center pillar) 10 is formed in a region being between the two window areas 50.

In contrast, there is a link that does not have a strut (a center pillar) 10 and has only one window area.

FIG. 10 shows a window area 50 described above in reference to FIG. 8 in an enlarged manner, and FIG. 10 shows a state in which a mounting bolt B and a nut N are engaged.

The endless track link 101 is a forged product. Consequently, there is a skin of forging on a nut mounting place at the periphery on the side of the track shoe attaching plane 6a (the lower side in FIG. 10) in a window area 50, and there are bumps and dips, although it is not obviously shown in FIG. 10. In case that a nut is set on the periphery on the side of the track shoe attaching plane 6a in the window area 50 as a nut seat face 50b, where the above-mentioned bumps and dips are formed, the nut slants undesirably. The nut N does not properly engage with the bolt B, and thus, it is possible that an engagement between a link 101 and a track shoe R fails.

In the prior art, broaching is applied to a nut seat face for 50b in order to secure the nut seat face 50b, to make the nut N properly engage with the bolt B without the nut N slanting, and to fasten firmly the link 101 to the track shoe R.

However, there is a problem that a process for applying the broaching is required and thus the number of processes is undesirably increased.

FIG. 11 shows a state of assembly step in which two links on the right and left hands (links 101) being connected with a pin P and a bushing Bu are fastened to a track shoe R by means of a bolt B and a nut N.

As clearly shown in reference to FIG. 8 etc., a ratio of the area of the two window areas 50 formed in the link 101 to the whole area of the link 101 is not so large. On the other hand, as shown in FIG. 11, the track shoe R considerably protrudes toward the side of the operator M relative to the link 101.

Under such circumstances, since it is necessary to visually recognize the bolt B and the nut N, to hold the nut N in a state where the operator's arm extends fully so as to secure the nut N in a suitable position. Thus, the efficiency of the assembly step for fastening the link 101 to the track shoe R is inferior in the prior art.

Here, it is also possible to weld and fix the nut N to the link 101 instead of holding the nut N with an operator's hand.

However, in a case that a welding process is applied to the link 101 which is a heat-treated product, a welded part of the link 101 is weakened in strength, and therefore, a fatal defect may be caused in a product.

For that reason, the nut N should not be welded to the link 101.

In reference to FIG. 10, as a result of analyses carried out by the applicants, it has been found that stress concentrates at both the ends of the periphery (both on the right and left ends of the periphery 50c at the lower part of the window area 50 shown in FIG. 10) on the side of the track shoe attaching plane 6a (the lower side in FIG. 10) in a window area 50 shown in FIG. 8, namely at the portions C shown by hatching in FIG. 10.

If the link 101 can be constructed so as to reduce such stress concentrations, it is possible to reduce various dimensions and the weight of the link 101. In other words, if the link 101 can be constructed so as to reduce such stress concentrations, it is possible to further reduce the weight of the link 101 relative to an other link being applied a load which is equal to a load applied to such link 101.

At the present stage, there is not a technology by which the aforementioned stress concentration has been reduced.

In other prior art, for example, there is a track link in which the engaging tooth surface may be formed so that an acute angle is proposed (for example, refer to Patent Document 1).

However, in such prior art, since the link is constructed by combining two link elements, the number of parts increases and the aforementioned various problems cannot be solved.

Patent Document 1: Japanese Patent Laid-open No. 59-220467

SUMMARY OF THE INVENTION

The present invention has been created in consideration of the aforementioned problems of conventional technologies and an object of the present invention is to provide an endless track link by means of which a stress concentration in the endless track link can be reduced and an efficiency of an assembling step can be improved.

An endless track link 100 according to the present invention comprises: a reinforcing part 7 formed in a region in a window area 5 where a stress concentration may be generated; the reinforcing part 7 extends in the direction apart from a track shoe and includes the extended part 8a of a through-hole (a through-hole 8 having a smooth inner surface) into which a track shoe connecting bolt is inserted; and a female thread 9 for engaging with the track shoe connecting bolt is formed at the extended part 8a of the through-hole 8.

The region in a window area 5, in which the region stress concentration is generated, is an end of the periphery of the window area 5 on the side of the track shoe in the endless track link.

In a case of an endless track link that includes a strut (a center pillar 10), stress concentration region is in an end of the periphery of a window area on the track shoe side, and is not in a region adjacent to the strut.

In the present invention, the track shoe connecting bolt is preferably a high tension bolt.

According to the present invention having the above-mentioned constructions, since a reinforcing part 7 is formed in the region in the window area 5 where a stress concentration can be generated and the reinforcing part 7 extends in the direction apart from a track shoe (in the direction indicated with the arrow Z in FIG. 1), the stress concentration in such the region is reduced and the strength of the link 100 improves in proportion to a reduction value of the stress concentration.

Consequently, by the present invention, if the strength of the link is the same, a weight of the link 100 can be reduced in proportion to an improvement value of the strength of the link 100.

Further, according to the present invention, since a female thread 9 for engaging with the track shoe connecting bolt is formed at the extended part 8a of a through-hole 8, it is not necessary for the track shoe connecting bolt to engage with a separately prepared nut. Thus, the number of parts related to the nut can be reduced, and a step for holding the nut at a position, at which the track shoe connecting bolt is engaged with the nut, is not required. As a result, according to the present invention, an efficiency in the step for assembling the track shoe and the link will be improved remarkably.

In the prior art, in order to tightly fasten a nut to a track shoe connecting bolt, it is necessary to smoothen the nut seat face, and thus, a broaching process is necessary. However, according to the present invention, it is not necessary to prepare such a nut, and therefore, a broaching process is not necessary.

In other words, according to the present invention, it is possible to connect a track shoe to a link 100 by means of the track shoe connecting bolt without a broaching process.

Further, according to the present invention, since the inner surface of a through-hole 8 is smooth and is formed so as to be so-called "plain" and a female thread 9 is formed in the extended part 8a of the through-hole 8 formed at a reinforcing part 7, a track shoe connecting bolt can immediately fall into a position near the part (the extended part 8a, in which a female thread 9) is formed, by steps for:

adjusting positions of a track shoe and a link 100;

inserting a track shoe connecting bolt into the through-hole 8 through the bolt hole on the side of the track shoe in a state that the track shoe is positioned above the link 100, in order to fasten the track shoe to the link 100, and lightly shaking the track shoe and the link 100. Since the track shoe connecting bolt freely falls into the plain part (the through-hole 8) of the link 100, the above-mentioned operations can be carried out by the present invention.

In such a situation, by rotating the bolt, the female thread 9 formed at the extended part immediately engages with the track shoe connecting bolt, and therefore, the track shoe is immediately connected to the link 100.

In addition, according to the present invention, since it is not necessary to fix (or weld) a nut to a link 100, there is no probability that the strength of a link and a nut, which are heat-treated products, are decreased by welding.

DETAILED DESCRIPTION OF THE PREFERRED EMBODIMENTS

Embodiments according to the present invention are hereunder explained in reference to attached drawings.

Firstly, the first embodiment is explained in reference to FIGS. 1 to 4.

Figure 1:
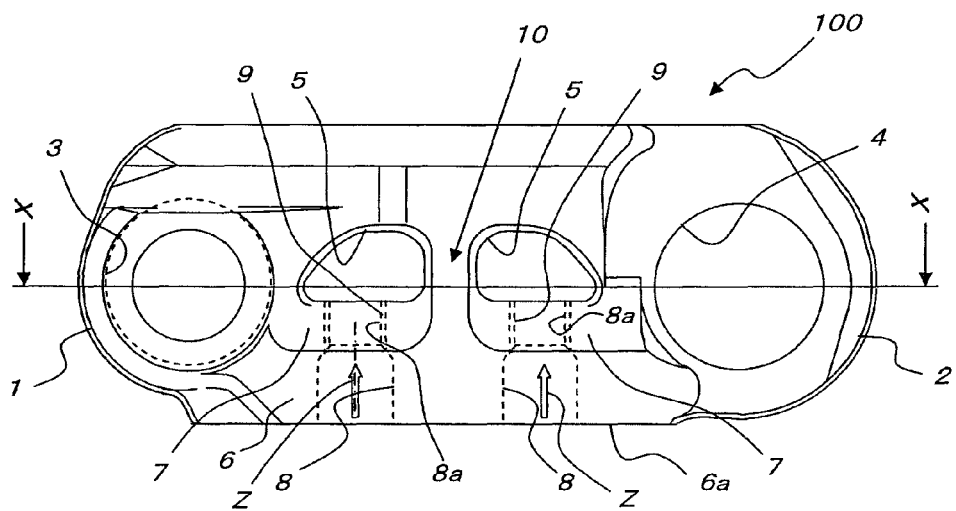
FIG. 1 is a side view showing an endless track link according to the first embodiment of the present invention.

In FIG. 1, in an endless track link 100, a first through-hole 3 is formed at the left end 1 and a second through-hole 4 is formed at the right end 2. Each of the first and second through-holes 3 and 4 is configured so that a pin and a bushing, which are not shown in the drawings, can be penetrated through such the through holes.

Figure 2:
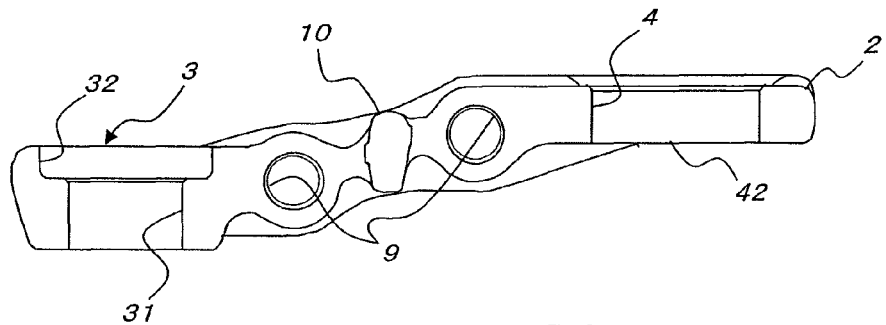
FIG. 2 is a sectional view taken on line X-X of FIG. 1.

In FIG. 2, in the first through-hole 3, a counter bore 32 and a through-hole 31 are formed. The through-hole 31 is concentric with the counter bore 32 and has a diameter smaller than a diameter of the counter bore 32.

Figure 9:
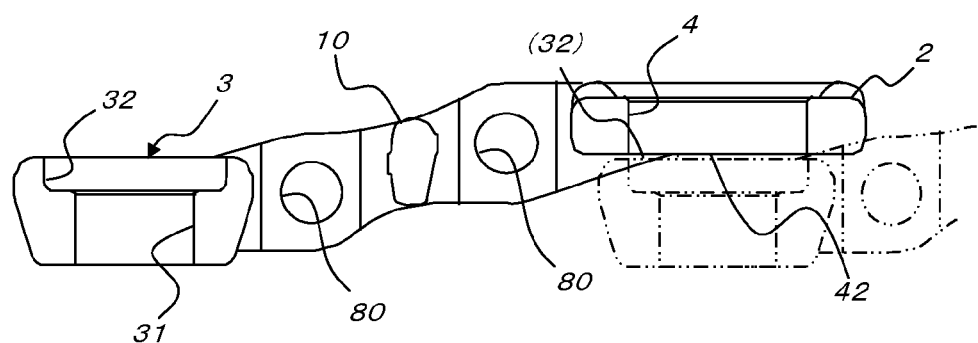
FIG. 9 is a sectional view taken on line X-X of FIG. 8.

In the same way as explained in FIG. 9 showing the prior art, the opening 42 in the second through-hole 4 is constructed so as to face the counter bore 32 in the first through-hole 3 of an another link (not shown) at a generally flat plane, in a case that adjacent pieces are connected to each other.

In FIG. 1, two window areas 5 are formed in the region between the first through-hole 3 and the second through-hole 4.

Further, a center pillar 10 (a strut) is formed in the region between the two window areas 5.

Figure 8:
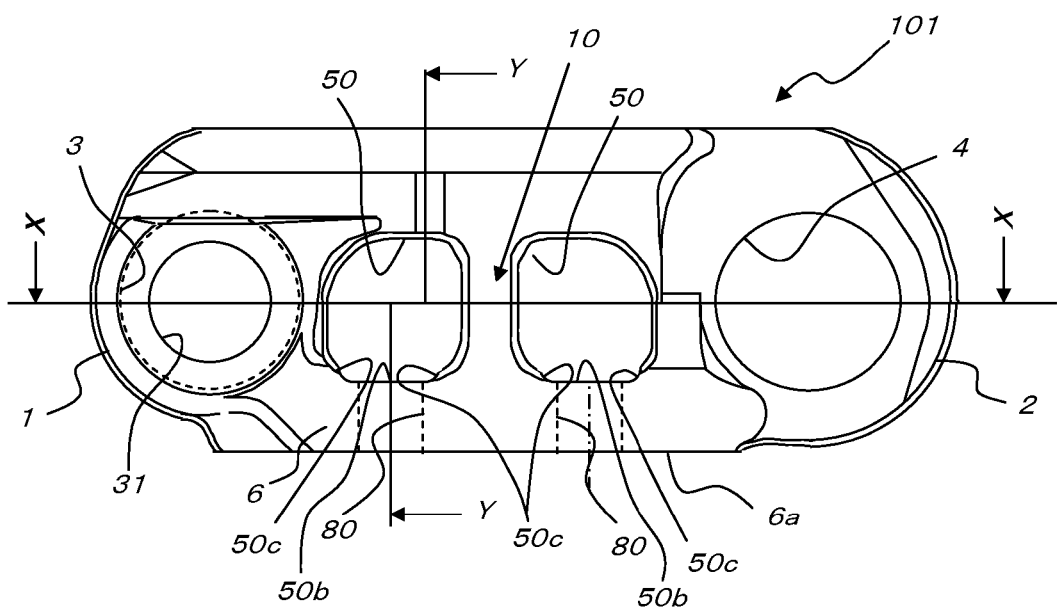
FIG. 8 is a side view showing an endless track link according to the prior art.

As it is obvious in comparison with a link 101 according to the prior art shown in FIG. 8, according to the first embodiment shown in FIG. 1, the link 100 is constructed so that the periphery of each of the window areas 5 on the side of a track shoe in the link 100 (in FIG. 1, the lower periphery of the track shoe) is positioned above, relative to the periphery of each of the window areas 50 on the side of a track shoe in the link 101 according to the prior art shown in FIG. 8 (in FIG. 8, the lower periphery of the track shoe).

Figure 3:
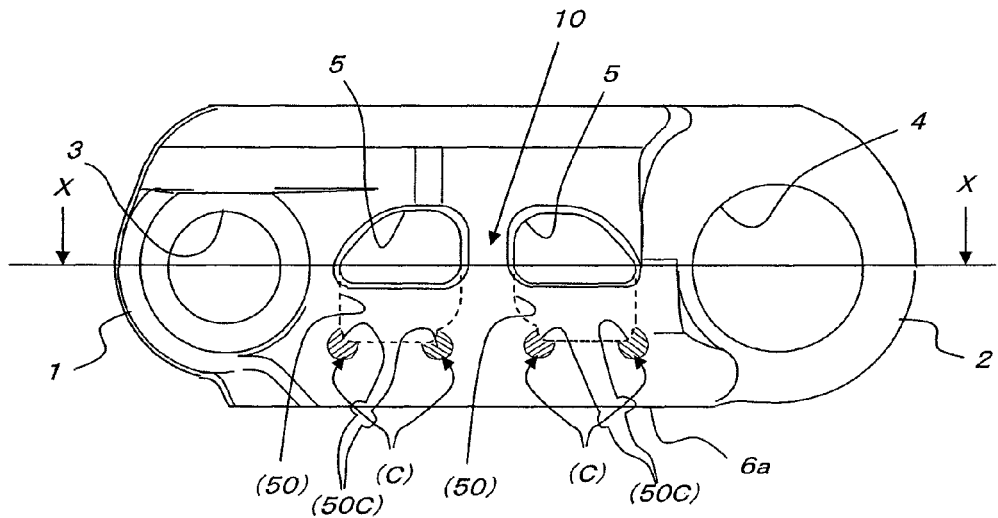
FIG. 3 is a side view showing the positions in the link according to the first embodiment that correspond to stress concentration regions in a link according to the prior art.

It is further obvious by referring to FIG. 3 that the lower periphery (the periphery on the track shoe side) of each of the window areas 5 shown in FIG. 1 is constructed so that the position thereof is above the lower periphery (the periphery on the track shoe side) of each of the window areas 50 shown in FIG. 8.

As described later, in FIG. 3, a link 100 according to the first embodiment and a link 101 according to the prior art shown in FIG. 8 are shown in an overlapping manner. In FIG. 3, the positions corresponding to the lower periphery (the periphery on the track shoe side) of the window areas 50 in FIG. 8 are shown with the dotted line between the regions C in which hatchings are added. Then, in FIG. 3, constructions of the link 100 shown in FIG. 1 are shown with the solid line and the lower periphery of each of the window areas 5 (the periphery on the side of a track shoe) is obviously positioned so as to be above the dotted line between the regions C in which the hatching are added (the lower periphery of each of the window areas 50 in FIG. 8).

In other words, in FIG. 1, a reinforcing part 7 is formed at a region, which is located below the lower periphery of each of the window areas 5 (the periphery on the track shoe side) of the link 100 according to the first embodiment and is located above the lower periphery of each of the window areas 50 of a link 101 according to the prior art.

The width of the reinforcing part 7 (the length in a direction perpendicular to a paper in which FIG. 1 is shown, or the length in the vertical direction in FIG. 2) is determined so as to be somewhat smaller than the width of the link lower part 6.

The reinforcing part 7 extends to the region in which a stress concentration has been generated in the link 101 according to the prior art (the region C represented by hatchings in FIGS. 3 and 10; descriptions referring to FIG. 3 will be mentioned hereinafter). In other words, the reinforcing part 7 is formed so as to cover the region in which stress concentration has been generated in the prior art (the region C shown in FIGS. 3 and 10). Therefore, the operation for reducing the stress concentration is carried out by the reinforcing part 7.

In FIG. 1, a track shoe attaching plane 6a is constructed by a bottom end surface of the link lower part 6. The through-holes 8 are formed from the track shoe attaching plane 6a toward the window areas 5. The through-holes 8 extend in the direction indicated with the arrow Z in FIG. 1, namely in the direction perpendicular to the track shoe attaching plane 6a, and then, bolts B (refer to FIG. 6, not shown in FIGS. 1 to 5) are inserted into the through-holes 8.

The inner diameter of each of the through-holes 8 is larger than the outer diameter of a bolt B not shown in FIGS. 1 to 5 and it is desirable that there is some dimensional allowance. The purpose of such allowance is to facilitate a bolt B being inserted into each of the through-holes 8 and to improve the efficiency of a step for fastening a track shoe to a link.

The extended parts 8a (of the through-holes 8) extending from the through-holes 8 are formed in the reinforcing parts 7 of the window areas 5 of the link 100.

The extended parts 8a of the through-holes 8 are concentric with the through-holes 8 and female threads 9 are formed in the extended parts 8a.

In the embodiment shown in the drawings, the extended parts 8a of the through-holes 8 are formed so as to penetrate to the side of the window areas 5. However, the extended parts 8a may be formed as "blind holes" in the reinforcing parts 7.

Figure 4:
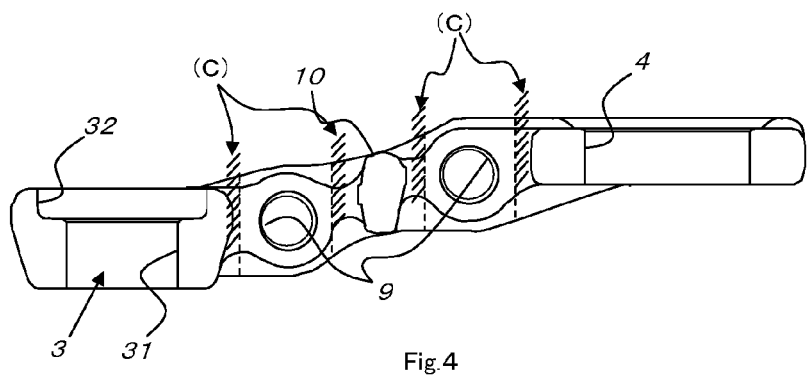
FIG. 4 is a sectional view taken on line X-X of FIG. 3.

FIGS. 3 and 4 indicate that the stress concentrations generated in the link 101 according to the prior art do not generate in the link 100 according to the first embodiment, by illustrating the link 100 according to the first embodiment and the portions in which the stress concentration has generated in the link 101 according to the prior art, in an overlapping manner.

In FIGS. 3 and 4, the broken lines show a link 101 according to the prior art and the regions represented by hatching are the portions in which the stress concentrations have generated in the link 101 according to the prior art. Then, in FIGS. 3 and 4, reference characters related to the link 101 according to the prior art are shown with parentheses.

Figure 10:
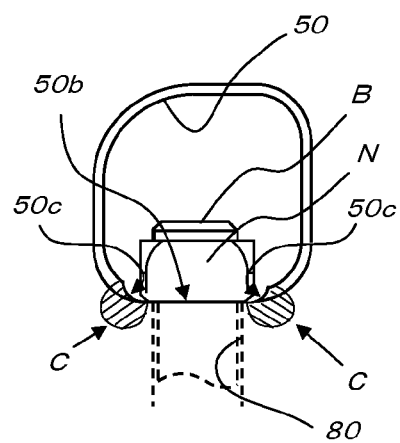
FIG. 10 is a partial side view showing constructions around a window area shown in FIG. 8 in detail.
Figure 11:
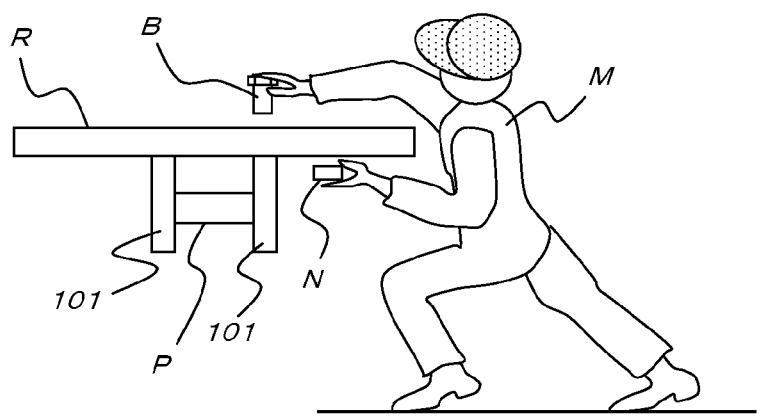
FIG. 11 is an explanatory view showing assembly steps of an endless track link according to the prior art.

As explained in reference to FIGS. 8 and 10, in the link 101 according to the prior art, the stress concentrations are generated in the regions C (the regions represented by hatching in FIGS. 3, 4, 8, and 10) at both the ends (both the right and left ends in FIGS. 8 and 10) of the periphery (the lower periphery 50c in FIGS. 8 and 10) of the window area 50 on the side of the track shoe attaching plane 6a.

In contrast, in the endless track link 100 comprising the above-mentioned constructions according to the first embodiment, the reinforcing parts 7 are formed in the regions corresponding to the regions C in which the stress concentrations have generated in the link 101 according to the prior art. By forming such reinforcing parts 7, the stress does not concentrate or the stress concentrations are reduced in the regions corresponding to the regions C (the regions in which the stress concentrations are generated in the link according to the prior art). As a result, it will be difficult to generate the stress concentrations and the strength of the endless track link 100 improves in proportion to a reduction in quantity of the stress concentration.

Then, if the strength of the link 100 is equal to the strength of the link 101 according to the prior art, the weight of the link 100 according to the first embodiment will be reduced in proportion to an incremental value in strength caused by the reduction in the stress concentration.

Further, in the endless track link 100 according to the first embodiment, since the female thread 9 for engaging the track shoe connecting bolt B is formed at the reinforcing part 7, a separately prepared nut for engaging with the track shoe connecting bolt B is not necessary, and also, a step for holding the separately prepared nut in order to engage with the track shoe connecting bolt B is not necessary. In addition, since parts relating to the separately prepared nut are not necessary, the numbers of parts can be reduced.

As a result, the efficiency in the assembling step of a track shoe and a link 100 will be remarkably improved.

Furthermore, in the prior art, a broaching process is required in order to engage the separately prepared nut to the track shoe connecting bolt. In contrast, in the endless track link 100 according to the first embodiment, it is not necessary to use such the nut and therefore a broaching process is not also required.

In other words, in the first embodiment, a broaching process requiring a large amount of labor cost can be deleted and it is possible to fasten the track shoe to the link 100 merely by means of the track shoe connecting bolt.

Then, in a broaching process wherein a cutting process is carried out with a cutting tool (a broach), a labor cost is spent in the cutting process itself, and moreover, a large amount of labor cost and labor time are also required for the initial setup (work setting up steps, etc.).

Furthermore, in the first embodiment, the inner surface of the through-hole 8 is smooth and is constructed so as to be so-called "plain" and the female thread 9 is formed in the extended part 8a of the through-hole 8. Consequently, the track shoe connecting bolt B falls easily to the position near the part in which the female thread 9 is formed, by following steps:

a step for adjusting the positions of the track shoe (not shown in the drawings) and the link 100, a step for inserting the track shoe connecting bolt B into the through-hole (not shown in the drawings) for a bolt formed in the track shoe and the through-hole 8 in a state that the track shoe is placed above the link 100, and a step for lightly shaking the track shoe and the link 100.

Since the inner diameter of the bolt through-hole formed in the track shoe and the inner diameter of the through-hole 8 in the link 100 are larger than the diameter of the track shoe connecting bolt B and the inner surfaces of the through-hole 8 are smooth, the track shoe connecting bolt B falls freely in the bolt through-hole formed in the track shoe and the through-hole 8.

By rotating the track shoe connecting bolt B in a fastening direction in a state that the track shoe connecting bolt B is positioned (fallen to) in a position near the part in which a female thread 9 is formed, the female thread 9 formed at the extended part 8a can engage with the track shoe connecting bolt B, and thus, the track shoe is immediately connected to the link 100.

In addition, in the first embodiment, since it is not necessary to fix a nut to the link 100, there is no possibility that the strength of the link and the nut, which are heat-treated products, are weakened by a welding step.

Figure 5:
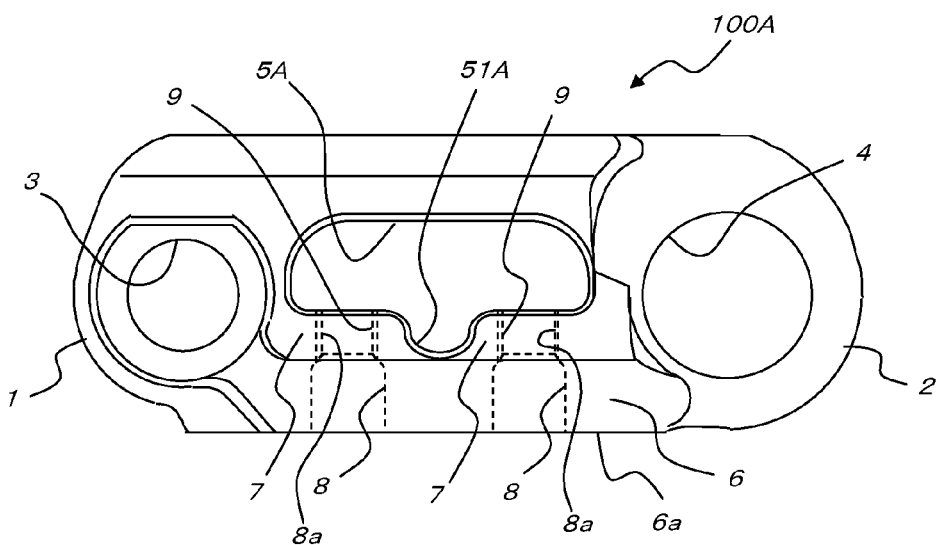
FIG. 5 is a side view showing an endless track link according to the second embodiment of the present invention.
Figure 6:
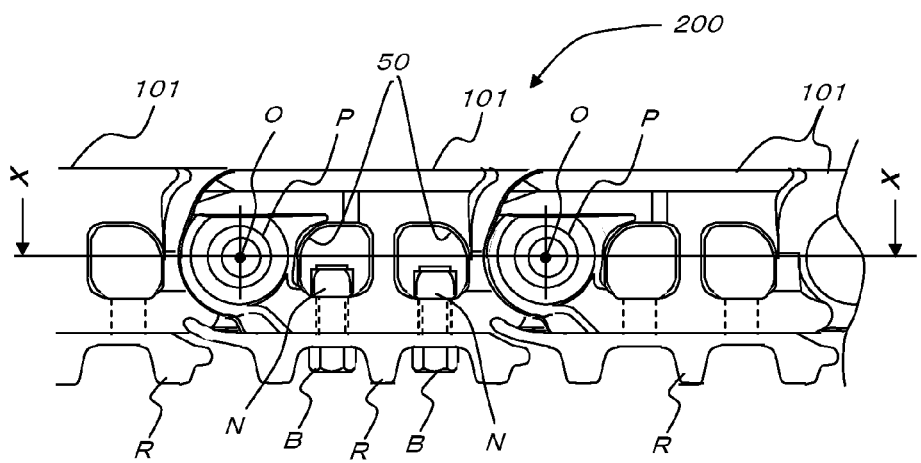
FIG. 6 is a side view showing a part of an endless track link according to the prior art.
Figure 7:
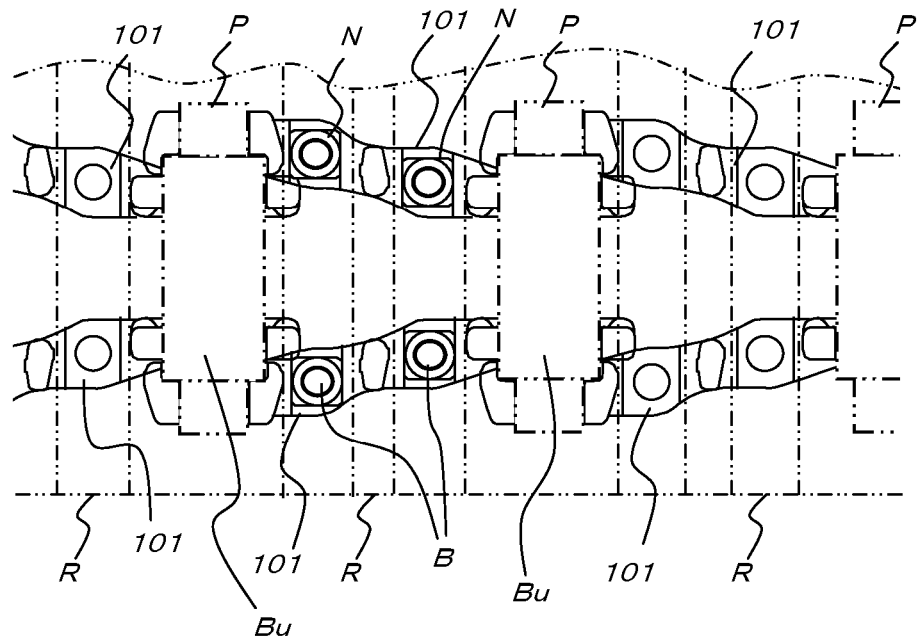
FIG. 7 is a sectional view taken on line X-X of FIG. 6.

Next, the second embodiment is explained in reference to FIG. 5.

In the first embodiment shown in FIGS. 1 to 4, two window areas 5 are formed at two locations in the center of the link and the strut (a center pillar) 10 is formed between the window areas 5.

In contrast, in an endless track link 100A according to the second embodiment shown in FIG. 5, a single window area 5A is formed in place of the two window areas 5 in the link 100 according to the first embodiment shown in FIG. 1, and the strut (the center pillar) 10 does not exist in the link 100A. A recess 51A is formed in the center of the lower periphery of the single window area 5A.

The endless track link 100A according to the second embodiment shown in FIG. 5, which does not have the strut (the center pillar) 10, which has the single window area 5A, and which has the recess 51A in the center of the lower periphery of the window area 5A, is used for a small excavator or a bulldozer.

The constructions, operations, and effects other than above-mentioned of the second embodiment shown in FIG. 5 are the same as those of the first embodiment shown in FIGS. 1 to 4.

EXPLANATIONS OF REFERENCE NUMERALS

1 First end in the longitudinal direction
2 Second end in the longitudinal direction
3 First through-hole
4 Second through-hole
5, 5A Window area
6 Link lower part
6a Track shoe attaching plane
7 Reinforcing part
8 Through-hole
9 Female thread
10 Strut (center pillar)
100, 100A Endless track link

What is claimed is:
1. An integrally forged link for an endless track comprising:
   a link lower part having a bottom surface which provides a track shoe attaching plane;
   a window area above the link lower part,
   wherein there are two window areas and a strut therebetween in said integrally forged link, and two bolt through-holes each extending from the track shoe attaching plane towards a respective one of the window areas and penetrating to a lower periphery of the respective window area;
   each of the bolt through-holes being provided with a female thread, whereby a track shoe connecting bolt is capable of being inserted and engaged therein;
   reinforcing parts in a region which is located under the lower periphery of the window areas and which is located above the link lower part, so that said reinforcing parts prevent stress concentrations in said integrally forged link and in which region stress concentrations would be generated in the absence of the reinforcing parts; and
   an extended part of each said bolt through-hole is located in the respective reinforcing part, said extended part being provided with said female thread.

* * * * *